J. E. THORNTON.
PHOTOGRAPHIC PRINTING PROCESS.
APPLICATION FILED JULY 8, 1919.
1,435,759.
Patented Nov. 14, 1922.
2 SHEETS—SHEET 1.
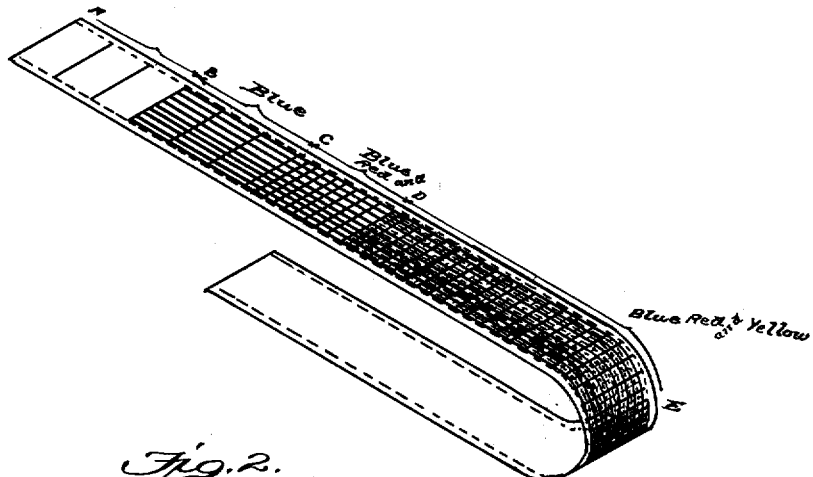
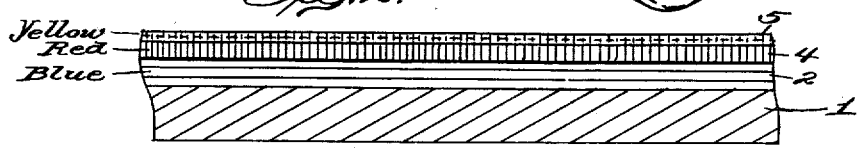
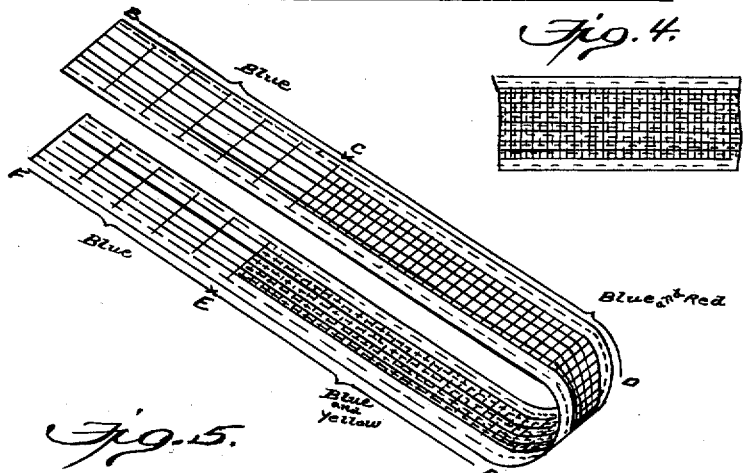
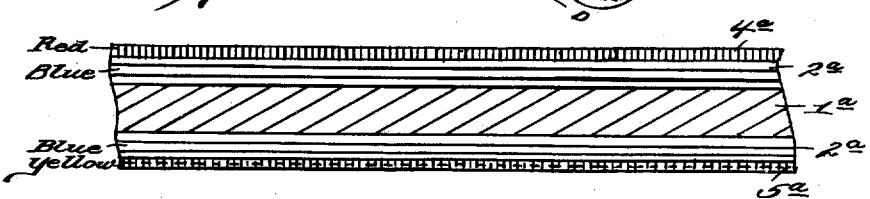
Inventor
John Edward Thornton
By
James L. Norris
Attorney J. E. THORNTON.
PHOTOGRAPHIC PRINTING PROCESS.
APPLICATION FILED JULY 8, 1919.
1,435,759.
Patented Nov. 14, 1922.
2 SHEETS—SHEET 2.
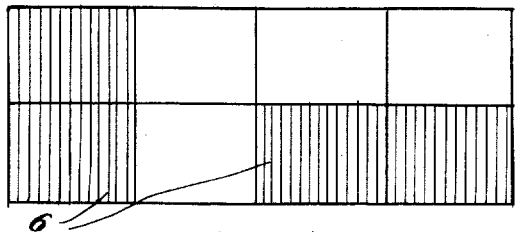
Fig. 6. (Red)
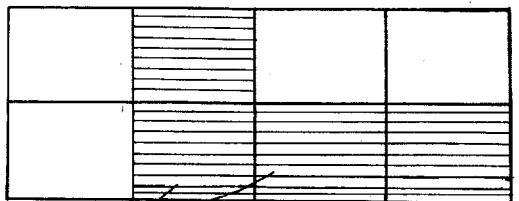
Fig. 7. (Blue)
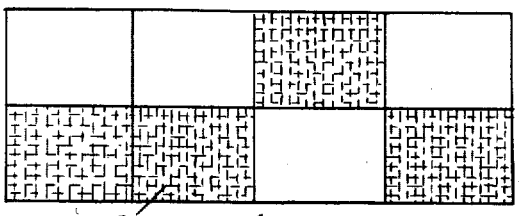
Fig. 8. (Yellow)
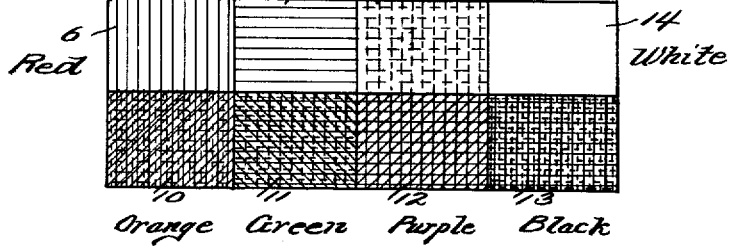
Fig. 9.
Inventor
John Edward Thornton
By
Attorney Patented Nov. 14, 1922.

1,435,759

UNITED STATES PATENT OFFICE.

JOHN EDWARD THORNTON, OF WEST HAMPSTEAD, LONDON, ENGLAND, ASSIGNOR TO JOHN OWDEN O'BRIEN, OF MANCHESTER, ENGLAND.

PHOTOGRAPHIC-PRINTING PROCESS.

Original application filed March 21, 1916. Serial No. 85,702. Divided and this application filed July 8, 1919. Serial No. 309,373.

*To all whom it may concern:*

Be it known that I, JOHN EDWARD THORNTON, a British subject, residing at West Hampstead, London, England, have invented certain new and useful Improvements in and Relating to Photographic-Printing Processes, of which the following is a specification.

The invention relates to the production of kinematograph films in heliochrome or multi-colour.

The object of the invention is to produce transparent continuous kinematograph films of indefinite length for optical projections by a combination of photo-chemical printing which produces a grainless pattern and photo-mechanical printing which produces a screen pattern, the grainy pattern, by superimposing the photo-mechanical printing of some of the colours upon a film already photo-chemically printed with the complete pictures or one of the colours in a monochrome of black, grey or colour.

The accompanying drawings illustrate films made in accordance with the present invention and also diagrams indicating the color characteristics of the films.

Figure 1 is a perspective view of a section of film made in accordance with the present invention and having three colors printed in superimposed relation on the front thereof, the back of the film being unprinted;

Figure 2 represents, on an enlarged scale, a cross section of the film as shown in Figure 1;

Figure 3 is a perspective view of a section of film also made in accordance with the present invention having two colors on the front and two colors on the back thereof;

Figure 4 represents a face view of a section of the film shown in Figure 3, illustrating how the colors of the film will appear when the film is held up to the light;

Figure 5 represents, on an enlarged scale, a cross section of the film represented in Figures 3 and 4; and Figures 6, 7, 8 and 9 are diagrams representing the different color sensations as the eye would see them if a series of landscape or portrait pictures were printed from three plates or film belts, the colors, however, being thoroughly mixed instead of appearing in isolated squares, as represented in these diagrams.

In carrying out the invention I utilize an original picture for each separate colour, produced by any of the various methods known for obtaining separate colour negatives or positives preferably that known as screen plate photography, and prepare or produce from each a set of photo-mechanical printing belts, one for each colour, as described in U. S. Letters Patent No. 1,361,783.

The transparent continuous kinematograph film is prepared with a sensitive surface and upon this I print an image photochemically in black, grey or colour, which will yield a very sharp, clear image of the whole picture or of one colour of the picture, and superimpose thereon by mechanical printing from the printing belts the partial images in their respective colours in broken tone markings of dots or lines. The pictures may be taken on two or three separate films or as sequent groups on a single film, thus producing an original picture film for each colour and in this case a printing belt will be produced from each original picture film or sequence as in the case of a single colour or monochrome original, or the pictures may be photographed on a single film by the process known as screen plate photography.

"Screen plate colour photography" is to be defined for the purpose of the present invention as the method described under this heading in an article commencing on p. 468 of Cassell's Cyclopaedia of Photography, published in the year 1912, also in "Farben-photographie mit Farbraster Platten" by Mr. Mebes, published in 1911 by Fernbach of Bunzlau.

In preparing printing belts from the original picture film, more particularly of the individual elemental colours, two or more of such printing belts may be made from each, one lightly exposed for the dense parts and the other fully exposed for the lighter tones. By printing from one or the other of these printing belts or from both in succession a high degree of tint is reached and desirable or special effects for harmonising harshness or other defects becomes practicable. Or one of such printing belts may be used for printing say a light shade or tone of blue or a greenish blue, and another for printing a deep blue or a purple blue to give better effect to the colours in the picture. This mode of operation is regarded as of special importance in relation to originals produced by the two-colour process.

The printing from the original picture film produced by screen plate photography as above described which is a "screen-plate-film" of two, three, or more colours is done directly or indirectly through a sequence of appropriate colour filters one for each colour upon a corresponding number of prepared strips.

The colours in the original picture film are thus analyzed out and separate printing belts prepared for each colour. Thus from a three colour original picture film three separate printing belts are produced each carrying the section or part of the picture in one colour.

It will thus be seen and understood that instead of printing the kinematograph film wholly by the mechanical methods and printing belts described in the patent above referred to, the film may be partially printed over a key picture, or over a single colour picture previously photo-chemically printed on the film in order to secure results of better quality and with greater sharpness of detail. The photo-chemically printed key picture will preferably be grey instead of black to avoid over-powering the colours subsequently superimposed thereon. Or the key picture may correspond to one of the elemental colours of the heliochrome picture. Alternatively this key may be the blue picture or element on which such blue picture may be produced by the well known iron process whether direct or through the intermediary of a silver image.

Referring to the accompanying drawings, the length of film A—B of the film shown in Figure 1 is without printing; the section or length B—C represents the first color printed photo-chemically by light, and colored blue, it extending from B to E; C—D represents a section of the film on which two colors have been printed, the photo-chemical blue section upon which is superimposed the red section, the latter being printed photo-mechanically, or without light, and extending from C to E; and D—E represents three colors printed on the film, i. e., the photo-chemical blue and photo-mechanical red and the photo-mechanical yellow, the yellow extending from D to E. The film as shown in Figure 1 is shown in cross section in Figure 2, it comprising a transparent film base 1 of celluloid or other transparent material on which is superimposed the blue section 2 of the picture which is printed photo-chemically and without grain, 4 represents the red section of the picture which is printed in minute dots of color deposited upon the section or layer 2, and 5 represents the yellow layer or section which is printed in dots of color deposited upon the layer 4. These different colors are represented in this figure by differentiated shade lines.

In Figure 3 where the film has two colors on the front and two colors on the back, the photo-chemical print in blue is duplicated on both sides of the film, while the photo-mechanical red is superimposed on one side and the photo-mechanical yellow is superimposed on the other side. In this figure, the length B—C represents the part printed photo-chemically in blue only on one side, while the length E—F represents the part printed photo-chemically in blue only on the opposite side of the film, the length C—D is printed on the face of the film with the photo-chemical print in blue and with the photo-mechanical print in red, and the length D—E on the back of the print is printed photo-chemically in blue and photo-mechanically in yellow. By referring to Figure 5 it will be seen that this film comprises a film base $1^a$ of celluloid or other transparent material, the blue layers or sections $2^a$, $2^a$ on opposite sides of the base, these being exactly alike and printed photo-chemically, without grain, by light from the same negative at one exposure, $4^a$ represents the red section of the picture which is printed in minute dots from a printing plate or belt by photo-chemical means, the image being of the grainy type, and $5^a$ represents the yellow section printed in a manner similar to the printing of the section 5 in Figures 1 and 2. Figure 4 represents how the red, blue and yellow in a film like that shown in Figures 3 and 5 will appear or be visible when the complete film is held up to the light. When the film is viewed in this way or by transmitted light, the series of complete pictures composed of all three colors are seen and they are formed by two identical blue images, a red sectional image superimposed upon one side, and a yellow image on the other side.

Figures 6 to 9 inclusive represent diagrammatically the different color sensations as the eye would see them, if a series of landscape or portrait pictures were printed from three plates or film belts, in which case the colors would be thoroughly mixed instead of being in isolated squares, as represented in the diagram. These colors would appear as follows: Of the primary colors, red would appear as indicated by the shaded portions 6 in Figure 6, blue would appear as indicated by the shaded portions 7 in Figure 7, and yellow would appear as indicated by the shaded portions 8 in Figure 8. The secondary colors obtained by superimposition of two colors, as is indicated in Figure 9, would appear as indicated by the shaded portion 10 as orange, 11 as green and 12 as purple. Black obtained by superimposition of three colors is designated by the area 13 in Figure 9, and white obtained by light passing through the bare portions of the transparent base and which are free from color is designated by the area 14 in Figure 9.

Instead of using a toned silver image for one section of a colour picture such photographic image may be printed by the carbon-bichromate or by the pinatype dyed-bichromate method, whereby the colour is obtained by direct development without subsequent toning. The same methods may be adopted for a black or grey key.

To ensure accuracy of registration of the several superimposed images all films for negatives or positives are accurately perforated by the same machine, and the printing belts that apply the greasy-ink images are likewise perforated to correspond. Shrinkage of the film carrying the photographically printed image is compensated for by suitable adjustments of the relative positions when applying the superimposed image.

What I claim as my invention and desire to protect by Letters Patent is:

1. A process of producing continuous kinematograph positive films with a series of heliochrome having an absolutely sharp and consists in preparing an original continuous series heliochrome picture by photographing in a camera by the multi-color screen method, printing from the original picture photo-chemically onto a sensitive final positive film to produce thereon parts of a heliochrome having an absolutely sharp and grainless image, and printing other parts of the original picture in color and in superimposed relation onto said image by a photo-mechanical screen pattern or grainy pattern process to complete the heliochrome positive.

2. A continuous kinematograph positive heliochrome film, comprising a grainless full tone image forming one part of the heliochrome, and other images of a grainy or half-tone pattern of dot, line or mosaic formation superimposed thereon and forming the other or completing part of the heliochrome.

3. A kinematograph positive heliochrome film comprising a grainless full-tone image, and other images in colors superimposed thereon which are of a grainy half-tone pattern of dots, lines or mosaic formation, the whole combination of superimposed printings giving the effect of a multicolor grainy print which is sharpened in outline by the grainy image.

4. The process of producing continuous kinematograph positive heliochrome films from colour elements analyzed out from an original multi-colour screen film, which comprises printing from each element separately in a different colour or shade, onto a sensitized film by superimposition methods, some of said printings being made by photo-chemical means and some by photo-mechanical means, thus giving a combination of photo-chemical and photo-mechanical processes.

5. A process of producing continuous kinematograph positive films with a series of heliochrome pictures printed thereon which comprises preparing an original picture film, printing part of the colors of the heliochrome onto a sensitized film from said original picture film by a photo-chemical process to secure an absolutely sharp and grainless image, preparing color elements from said original picture film, and printing other colors onto said sensitized film from said color elements and in superimposed relation by a photo-mechanical screen pattern or grainy pattern process, thus producing a positive series strip on which the colors are printed as superimposed layers.

6. A process of producing kinematograph heliochrome positive films bearing series of pictures in natural colors, which consists in taking the original heliochrome or camera picture upon a multi-color screen film, making therefrom full-tone reproductions in the form of printing belts, one printing belt being provided for each color, shade or section, printing part of the colors of the heliochrome onto the final film by a grainless photo-chemical process, and printing a color, shade or section from each printing belt onto the final film by a photo-mechanical grainy pattern or screen pattern process.

7. The process of producing kinematograph heliochrome positive films by superimposed printing processes from heliochrome originals made by the multi-color screen process, which consists in making a set of intermediary analyzed single color reproduced cliches of full-tone character without dots, lines, mosaic or other pattern and with the images extending over the entire area of each picture, printing part of the colors of the heliochrome from said cliches onto a sensitized film by a photo-chemical process to secure an absolutely sharp and grainless image in the final positive, preparing photo-mechanical printing belts from said cliches, and printing other colors of the heliochrome from said printing belts onto said sensitized film by a photo-mechanical screen pattern or grainy process.

8. A complete kinematograph heliochrome positive film of the superimposed type consisting of one piece of film stock having photo-chemically printed thereon a full tone grainless image in one color and having superimposed thereon another color section image, in another color, of the half-tone grainy type and composed of mechanically applied coloring matter attached to the surface of the film stock in which the first photo-chemical image is embedded.

9. A continuous kinematograph heliochrome positive film in a plurality of color printings, comprising a photo-chemical foundation print and a succession of photo-mechanical prints superimposed in registry, said prints being in different colors and of different color values.

In testimony whereof I have hereunto set my hand in presence of two subscribing witnesses.

JOHN EDWARD THORNTON.

Witnesses:
J. OWDEN O'BRIEN,
N. J. A. HORSWORTH.

CERTIFICATE OF CORRECTION.

Patent No. 1,435,759.                         Granted November 14, 1922, to

JOHN EDWARD THORNTON.

It is hereby certified that error appears in the printed specification of the above numbered patent requiring correction as follows: Page 3, line 31, claim 1, strike out the words "having an absolutely sharp and" and insert instead "pictures printed thereon, which"; and that the said Letters Patent should be read with this correction therein that the same may conform to the record of the case in the Patent Office.

Signed and sealed this 17th day of July, A. D. 1928.

(Seal)                                                            M. J. Moore,
                                                           Acting Commissioner of Patents.